United States
Loree et al.

4,144,464
Mar. 13, 1979

[54] DEVICE AND METHOD FOR NORESONANTLY RAMAN SHIFTING ULTRAVIOLET RADIATION

[75] Inventors: Thomas R. Loree; Dean L. Barker, both of Los Alamos, N. Mex.

[73] Assignee: The United States of America as represented by the United States Department of Energy, Washington, D.C.

[21] Appl. No.: 872,292

[22] Filed: Jan. 25, 1978

[51] Int. Cl.$^2$ ............................................. H03F 7/00
[52] U.S. Cl. .............................. 307/88.3; 331/94.5 R
[58] Field of Search ...................... 307/88.3; 321/69 R

[56] References Cited
PUBLICATIONS

Sze et al., "Applied Physics Letters", Jul. 1, 1977, pp. 37-39.

Primary Examiner—Rudolph V. Rolinec
Assistant Examiner—Darwin R. Hostetter
Attorney, Agent, or Firm—Dean E. Carlson; William W. Cochran, II

[57] ABSTRACT

A device and method for nonresonantly Raman shifting broad band uv excimer laser radiation, which enhances preselected Stokes signals by varying the pressure of the Raman scattering medium, the focal interaction length of the incident radiation within the Raman scattering medium and its power density level. Gaseous molecular $H_2$, $D_2$, $CH_4$ (methane), HD and mixes thereof, and liquid $N_2$ are used as the Raman scattering medium to frequency shift the outputs of high power KrF and ArF lasers. A cable fed discharge with an unstable resonant cavity configuration is utilized to produce the output laser power levels required for operation.

25 Claims, 22 Drawing Figures

STOKES

*Fig. 1A*

ANTI-STOKES

DEVICE AND METHOD FOR NORESONANTLY RAMAN SHIFTING ULTRAVIOLET RADIATION

BACKGROUND OF THE INVENTION

The present invention pertains generally to lasers and more particularly to nonresonant Raman shifting of laser signals.

Recent developments in rare gas halide lasers such as reported in Appl. Phys. Lett. 29, 707, (1976) and Appl. Optics, 16, 1792, (1977) have resulted in substantial output powers in the uv spectral region. Although the photochemical applications from the generation of uv light at 248 nm and 193 nm (from KrF and ArF lasers respectively) have been numerous, it is desirable for general photochemical applications to have a greater selection of uv wavelengths available with reasonable conversion efficiency.

The technique of Raman shifting has been theoretically shown and experimentally proven as disclosed in the following articles: "Effective Stimulated Scattering in the Ultraviolet and Dispersion of Gain in the 1.062–0.26$\mu$ Band" by S. A. Akhmanov et al., JETP Lett. 15, 185 (1972) wherein Raman scattering was demonstrated in liquid $N_2$ from excitation radiation of a stable fourth harmonic of a neodymium laser, "Investigation of Stimulated Raman Scattering and Gaseous Excited by Fourth Harmonic of Neodymium Laser Radiation" by G. V. Venkin et al. appearing in Sov. J. Quant. Electron., 5, 1348 (1972), where results are given of an experimental investigation of stimulated Raman scattering in gaseous hydrogen and deuterium excited by a fourth neodymium laser harmonic. Additionally, an article entitled "Statistical Phenomena in Raman Scattering Stimulated by a Broad Band Pump" by S. A. Akhmanov et al, Sov. Phys. JETP, 39, 249 (1974), discloses the results of a theoretical and experimental investigation of stimulated scattering in liquid $N_2$ by a broad band pump. Another theoretical description of the Raman scattering processes is disclosed in an article entitled "Simple Theory of Diffuse Vibrational Structure in Continuous uv Spectra of Polyatomic Molecules. 1. Collinear Photodissociation of Symmetric Triatomics" by Russel T. Pack, appearing in the J. of Chem. Phys. 65, 4765, (1976). Although these articles disclose the feasibility of generating numerous wavelengths in the uv spectral region, there is no disclosure of a method or apparatus for enhancing particular Stokes signals to obtain desired wavelengths with reasonable conversion efficiency. Although it is known in the prior art as disclosed in "Energy and Time Characteristics of Stimulated Raman Scattering of Light" by V. A. Zubov et al., Sov. Phys. JETP Vol. 28, p. 231, (1969), that higher power densities within the Raman scattering medium produce a greater number of Stokes signals, this phenomena has not been previously used to enhance any particular Stokes signal, and particularly, not in combination with other parameters which vary the Stokes outputs in a predetermined manner.

SUMMARY OF THE INVENTION

The present invention overcomes the disadvantages and limitations of the prior art by providing a method and apparatus for enhancing preselected frequencies generated by nonresonant Raman scattering of ultraviolet radiation. This is accomplished by varying the Raman scattering medium pressure, and the power density and focal interaction length of the input signal, such that a preselected Stokes signal will be maximally enhanced.

It is therefore an object of the present invention to provide a method and apparatus for nonresonantly Raman scattering ultraviolet radiation.

It is also an object of the present invention to provide a method and apparatus for nonresonantly Raman scattering ultraviolet radiation to produce preselected frequencies with high conversion efficiency.

Another object of the present invention is to provide a method and apparatus for nonresonantly Raman scattering of ultraviolet radiation to enhance a preselected Stokes signal.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing Abstract of the Disclosure is for the purpose of providing a nonlegal brief statement to serve as a searching and scanning tool for scientists, engineers, and researchers and is not intended to limit the scope of the invention as disclosed herein nor is it intended to be used in interpreting or any way limiting the scope or fair meaning of the appended claims.

DETAILED DESCRIPTION OF THE PREFERRED EMBODIMENT OF THE INVENTION

Figure 1A:
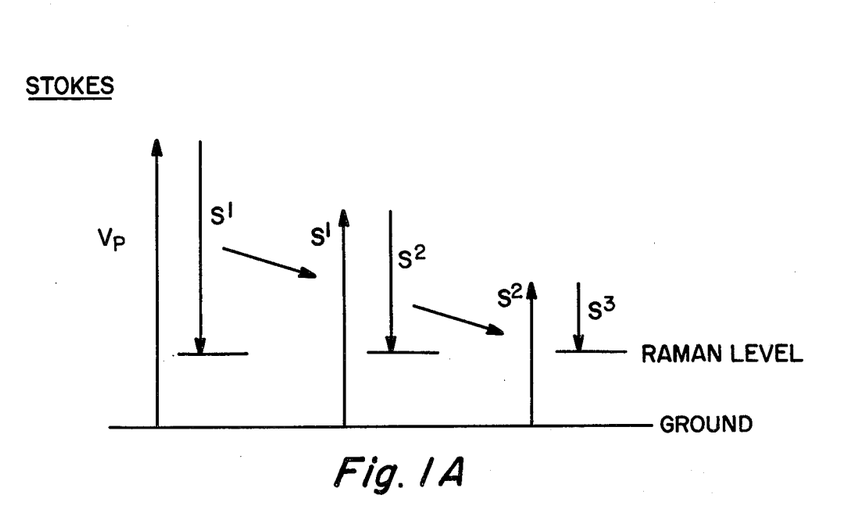
FIG. 1A is a diagramatic illustration of Stokes generation in the Raman scattering process.

The Raman scattering process occurs in molecules such as $H_2$, $D_2$, methane, HD, mixtures thereof and liquid $N_2$, among others, which have electronic states, i.e., vibrational or rotational energy levels, which cannot directly absorb photons, but can indirectly steal part of the energy of an incident photon. As shown in FIG. 1A, an incident photon with the frequency $\nu_p$ is converted to the first down-shifted frequency, i.e., the first Stokes ($S_1$), with the remaining energy spent in exciting an electron to the Raman level. The process then cascades as shown in FIG. 1A so that the $S_1$ photon converts to $S_2$ and so on, down the chain, as shown.

Figure 1B:
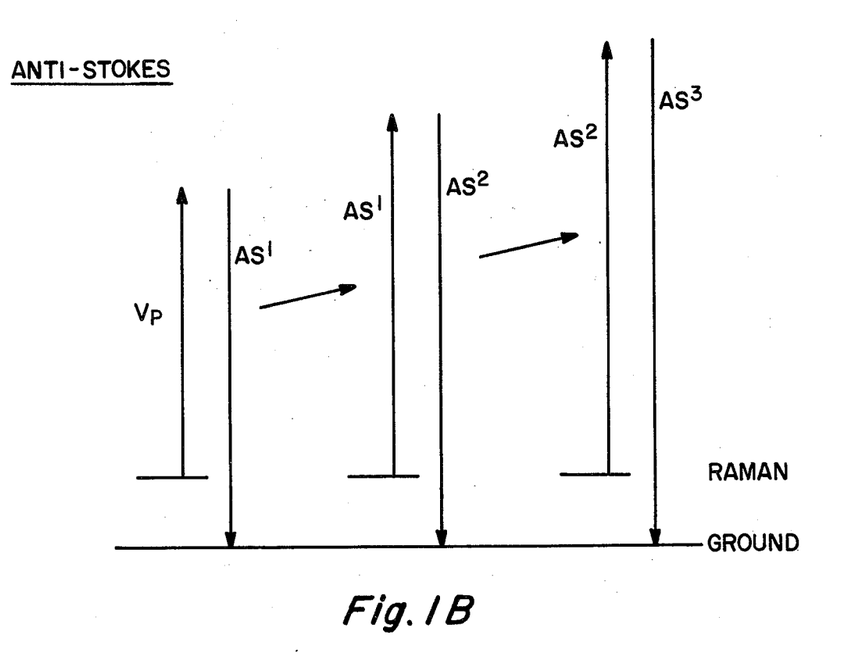
FIG. 1B is a diagramatic illustration of anti-Stokes generation in the Raman scattering process.
Figure 2:
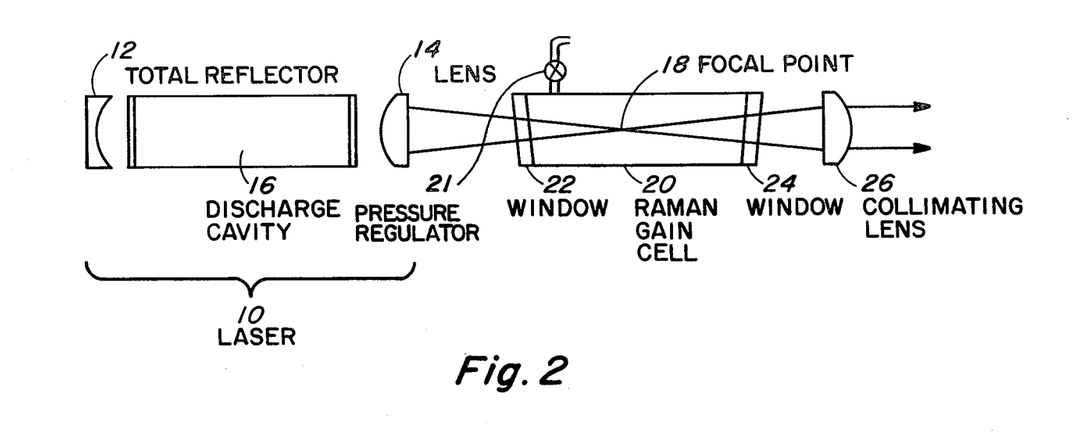
FIG. 2 is a diagramatic illustration of the device of the preferred embodiment of the invention.

FIG. 2 illustrates the manner in which incident radiation $n_p$ is upshifted in frequency to produce the anti-Stokes components. Although the anti-Stokes components are generated by a four-wave mixing, FIG. 1B graphically illustrates the manner in which up-conversion can cascade.

Since the process is a nonresonant Raman process, the wavelength of the incident laser is not critical and the process will cascade as shown in FIGS. 1A and 1B to produce numerous useful shifted wavelengths. This results from the fact that, unlike the resonant process where there must be an intermediate energy level present near the incident photon energy so as to produce only one shifted wavelength, no near resonant energy level is required to generate the process.

FIG. 2 illustrates the device of the preferred embodiment of the invention. The device comprises a laser 10 having an optical cavity formed by total reflector 12 and lens 14. The total reflector 12 and lens 14 form an unstable resonating cavity through the discharge cavity 16 to produce maximum power output. A suitable laser 10 is disclosed in FIGS. 3 and 4. Alternatively, a Tachisto Tac II laser suitably modified for KrF or ArF operation, as disclosed in Applied Optics, Vol. 16, No. 7, July 1977, pp. 1792 and 1793, can be used as a laser source 10.

The ultraviolet radiation generated by laser 10 is focused at a focal point 18 within the Raman gain cell 20 by lens 14. Windows 22 and 24 are suitable Brewster angle windows for maximizing energy transference. The Raman gain cell 20 contains the Raman scattering medium such as $H_2$, $D_2$, $CH_4$, HD, $D_2$, $H_2$ mix, $H_2$, $CH_4$ mix or other suitable mixtures thereof. The pressure of these gases in Raman gain cell 20 is controlled by pressure regulator 21. The Raman scattered radiation is emitted by window 24 and focused by collimating lens 26. Details of experimental data obtained using the modified Tachisto Tac II laser in the experimental setup, as shown in FIG. 2, are disclosed in an article entitled "Efficient Raman Shifting of ArF and KrF Laser Wavelengths" by T. R. Loree et al., appearing in Appl. Phys. Lett. 31, 37, (1977).

Figure 3:
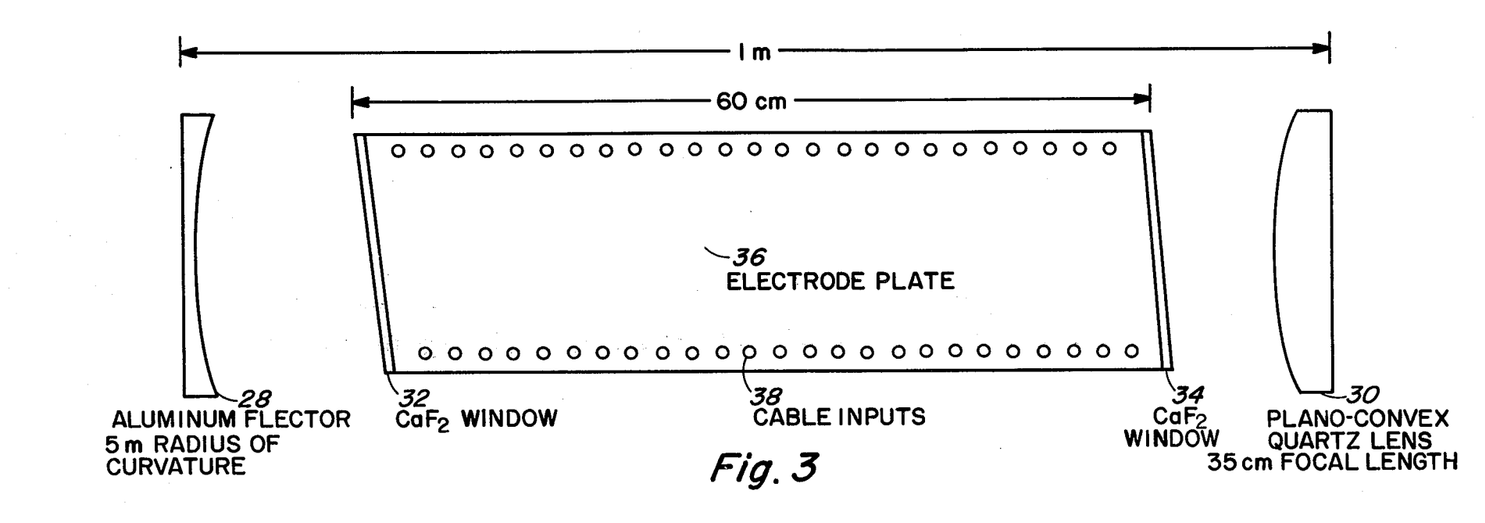
FIG. 3 is a diagramatic illustration of the optical and discharge cavity of the laser of the preferred embodiment of the invention.
Figure 4:
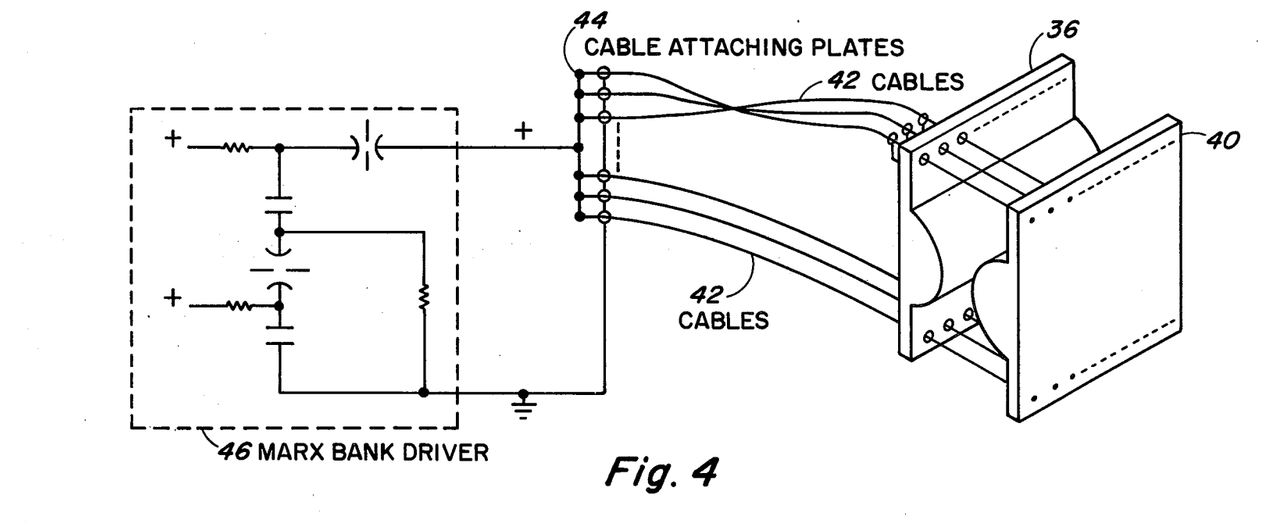
FIG. 4 is a schematic illustration of the electrical components of the preferred embodiment of the invention.

FIGS. 3 and 4 disclose a cable fed discharge laser which can, alternatively, be used in the device of the present invention. As shown in FIG. 3, the cable fed discharge laser has an optical cavity formed from an aluminum reflector 28 having a 5 m radius of curvature and a plano convex quartz lens 30 located 1 m from aluminum reflector 28 and having a 35 cm focal length. An electrical discharge cavity which is 60 cm in length and has $CaF_2$ windows 32 and 34 is located within the above described optical cavity. Electrode plate 36 has 48 cable input attachments 38 located along the top and bottom of the cavity, as more clearly shown in FIG. 4. The cable sheaths are attached to a first electrode plate 36 while the interior of the cable is attached to electrode plate 40. The cable sheaths of cables 42 are also attached to a cable attaching plate 44 which is in turn, attached to the ground connection of a Marx bank driver 46, similarly, the interior portions of the cables 42 are attached to the positive output of the Marx banks driver 46. The discharge electrode separation of the laser of FIGS. 3 and 4 is 2 cm while the lasing width is approximately 2.6 cm. The cable array 42 consists of 48 eight-feet-long Essex 40/100 cables which have 62 pF/ft and 63 nH/ft., resulting in an impedance of 32 ohm per cable or 0.67 ohms total impedance for the 48 cables connected in parallel. The total cable capacitance is 23.8 nF. The value of the capacitors for the two stage Marx bank is 0.15 $\mu$F. Therefore, a 75 nF capacitor is ringing into the cables since the Marx bank discharges the capacitors in series. The optimum gas mixtures found for the ArF laser are 0.2%$F_2$, 10%Ar, and 88.8%He while for the KrF laser 0.1%Fe, 2.4%Kr, and 97.5%He. The optimum pressure for KrF is 62 psi absolute while for ArF is 37 psi absolute. This produces outputs of approximately 700 mJ for KrF and approximately 310 mJ for ArF.

Figure 5:
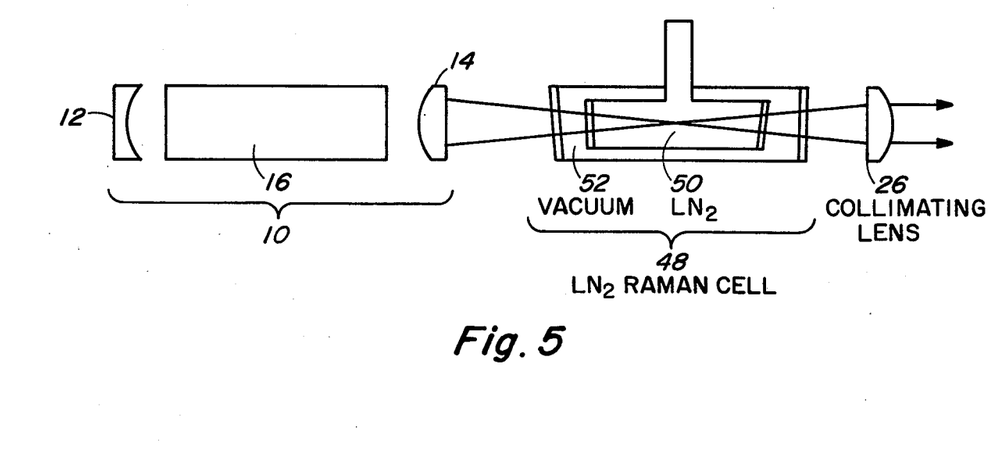
FIG. 5 is a diagramatic illustration of the device for Raman scattering in liquid $N_2$.
Figure 13:
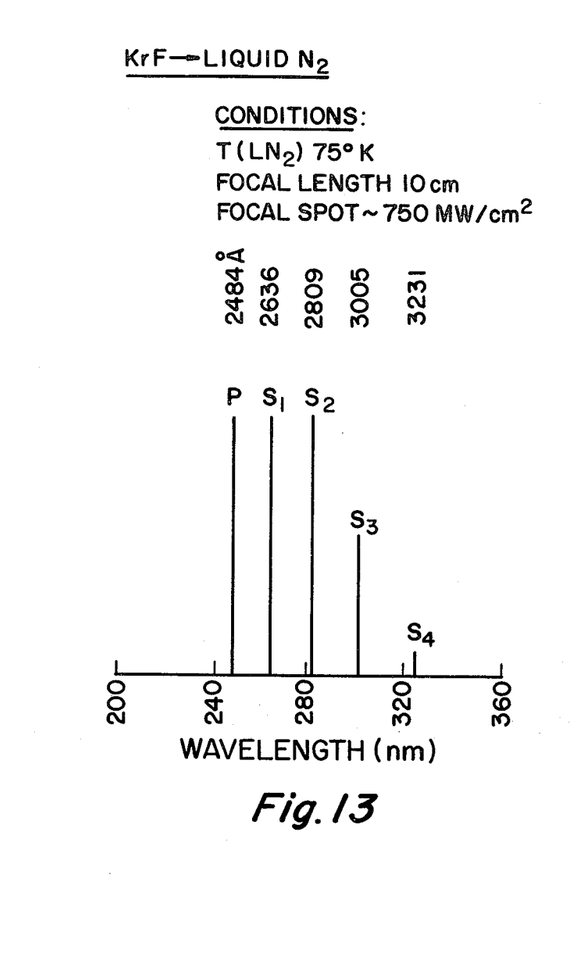
FIG. 13 is a graph of experimental data obtained in scattering KrF in liquid $N_2$.
Figure 14:
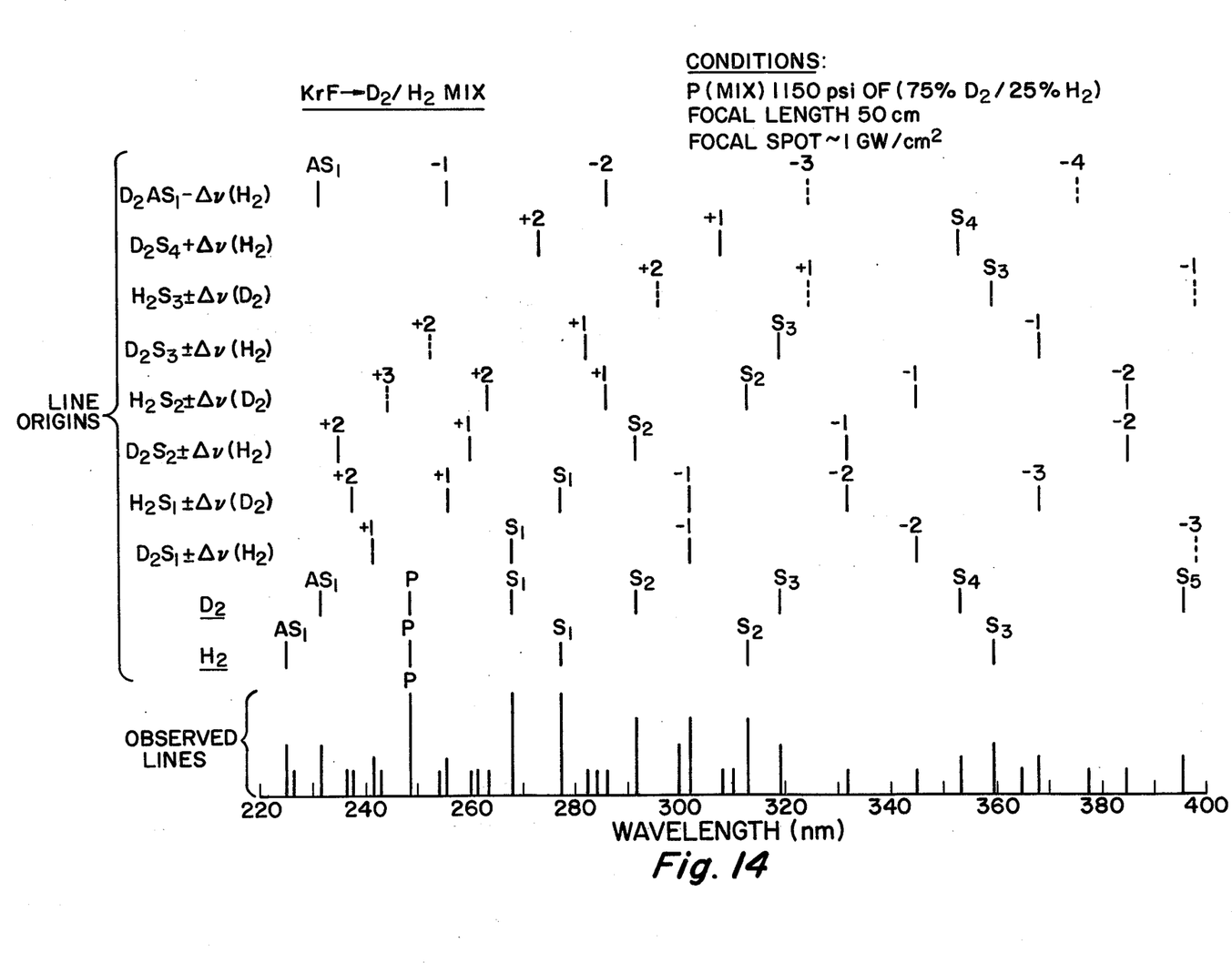
FIG. 14 is a graph of experimental data obtained in scattering KrF in a $D_2$ $H_2$ mix.
Figure 15:
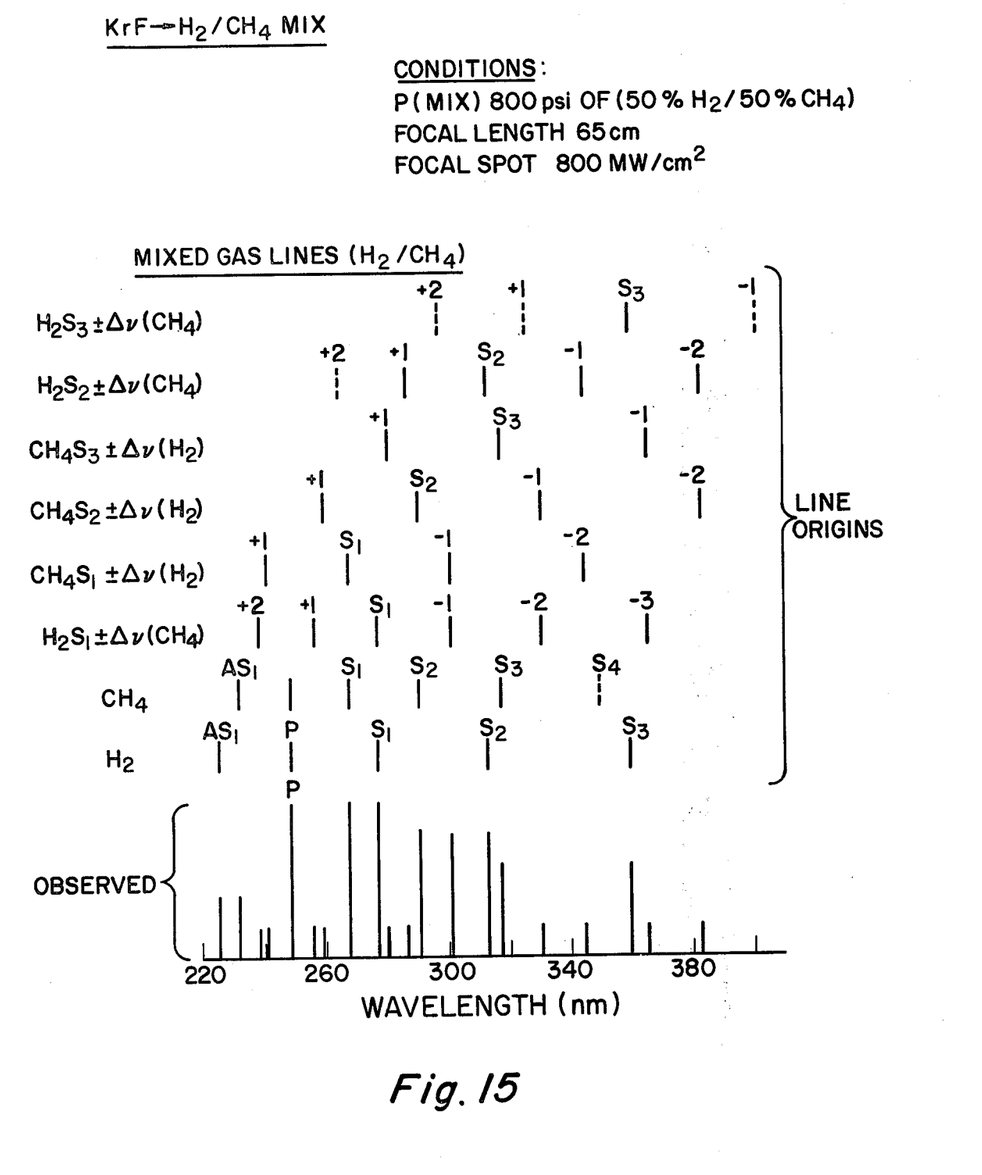
FIG. 15 is a graph of experimental data obtained in scattering KrF in $H_2$ $CH_4$ mix.
Figure 16:
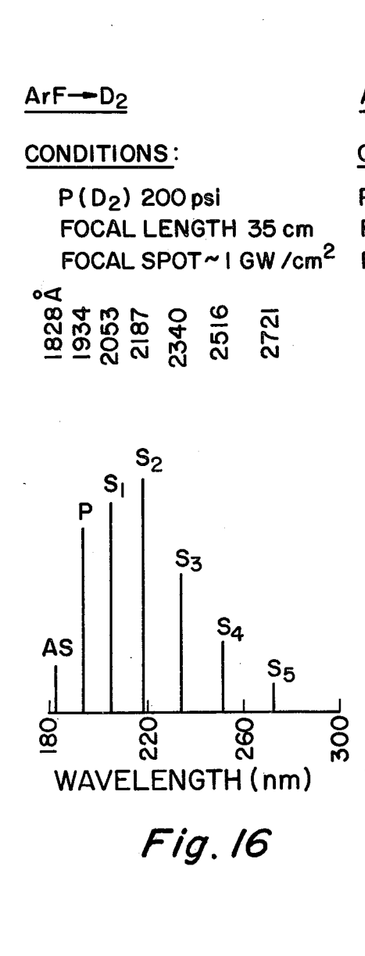
FIG. 16 is a graph of experimental data obtained in scattering ArF in $D_2$ at 200 psi.
Figures 17, 18:
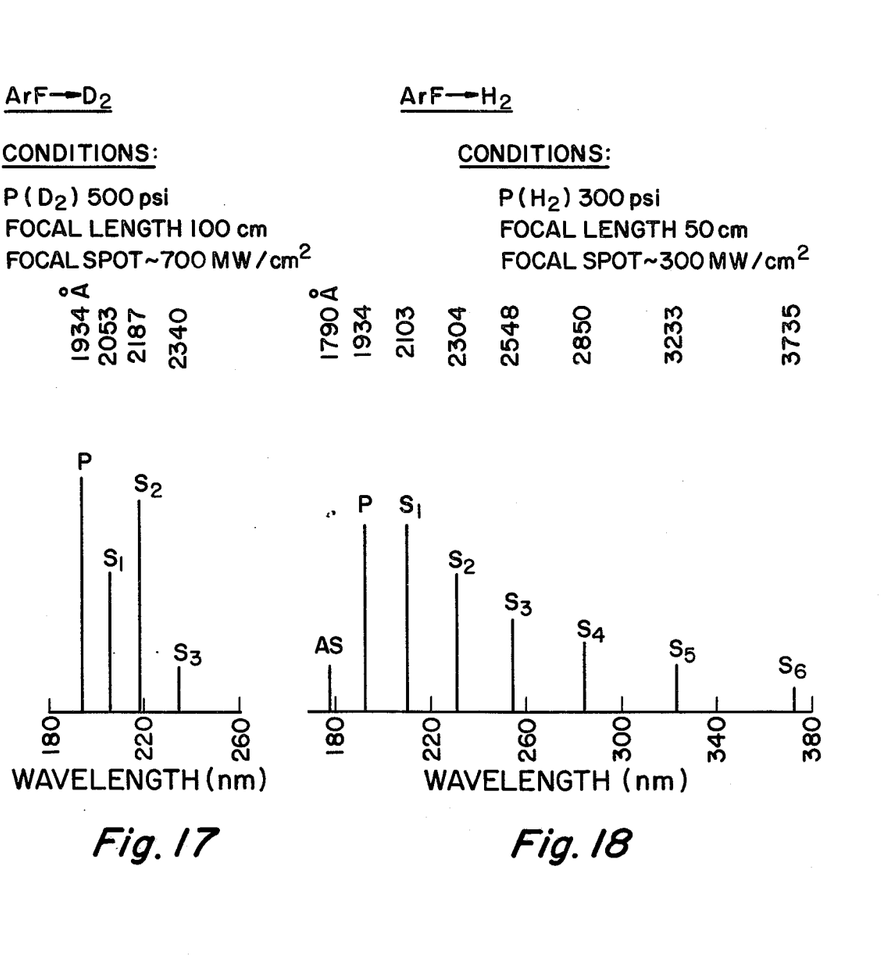
FIG. 17 is a graph of experimental data obtained in scattering ArF in $D_2$ at 500 psi.
FIG. 18 is a graph of experimental data obtained in scattering ArF in $H_2$ at 300 psi.
Figure 19:
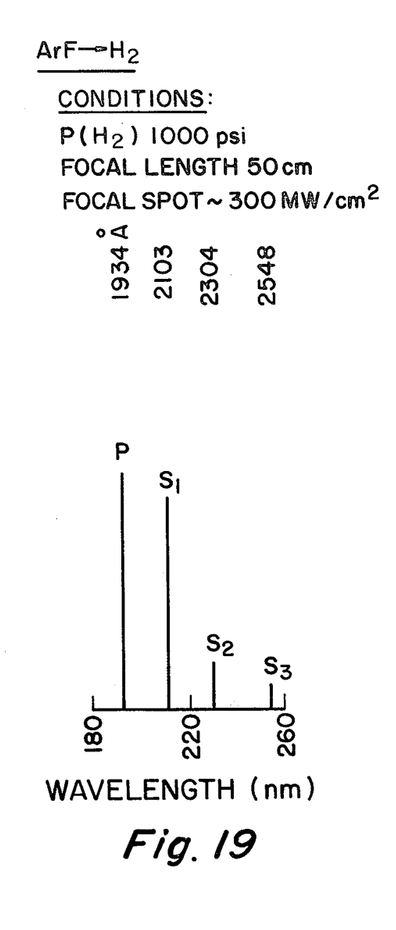
FIG. 19 is a graph of experimental data obtained in scattering ArF in $H_2$ at 1000 psi.
Figure 20:
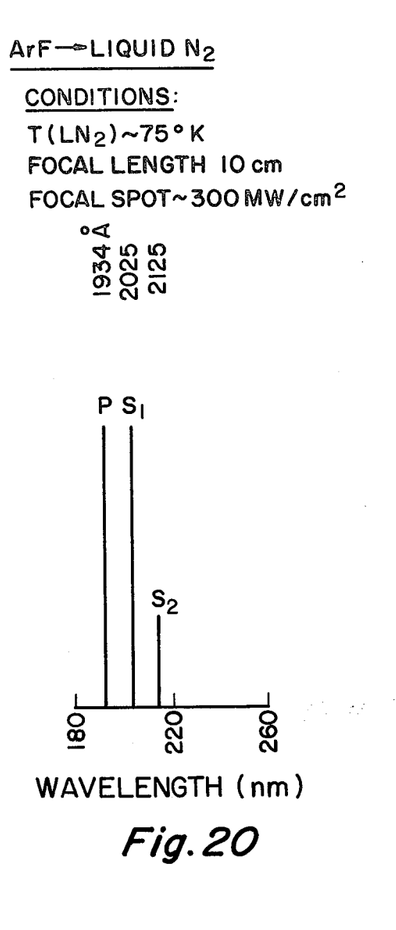
FIG. 20 is a graph of experimental data obtained in scattering ArF in liquid $N_2$.
Figure 21:
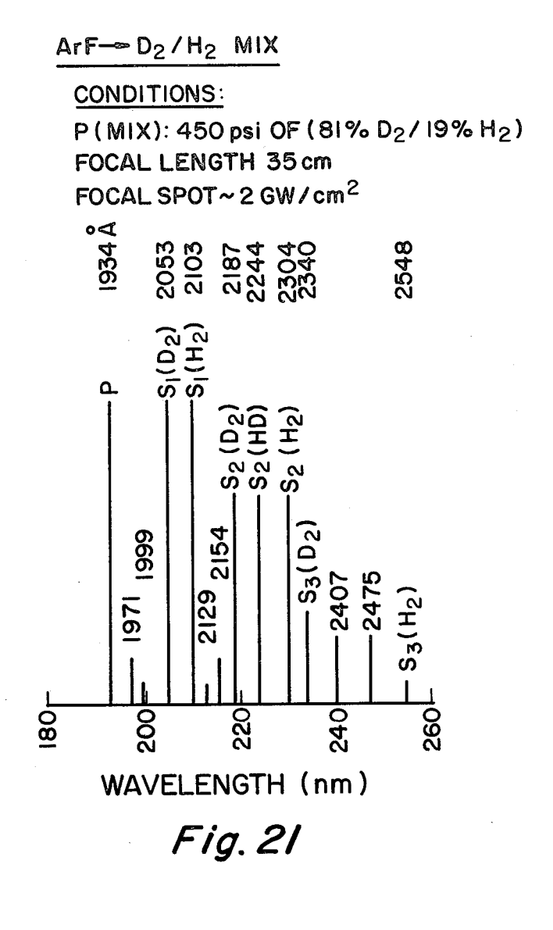
FIG. 21 is a graph of experimental data obtained in scattering ArF in a mixture of $D_2$ and $H_2$.

FIG. 5 discloses the experimental arrangement for Raman scattering in liquid $N_2$. The liquid $N_2$ Raman cell 48 is a doubled windowed Dewar in which the inner cell contains liquid $N_2$ 50 and the outer cell a vacuum 52. By using a broad band laser output, two downshifts in the classic Raman scattering process are produced. Additional downshifts beyond the second downshift must be generated by the four wave mixing process. Since liquid $N_2$ is very dense, it has great dispersion so as to negate the four wave mixing process. As a result, large power inputs drive a substantial amount of energy into the second Stokes with minimal conversion to third or subsequent downshifts. The experimental data is shown in FIGS. 13 and 20 of the drawings.

Figure 6:
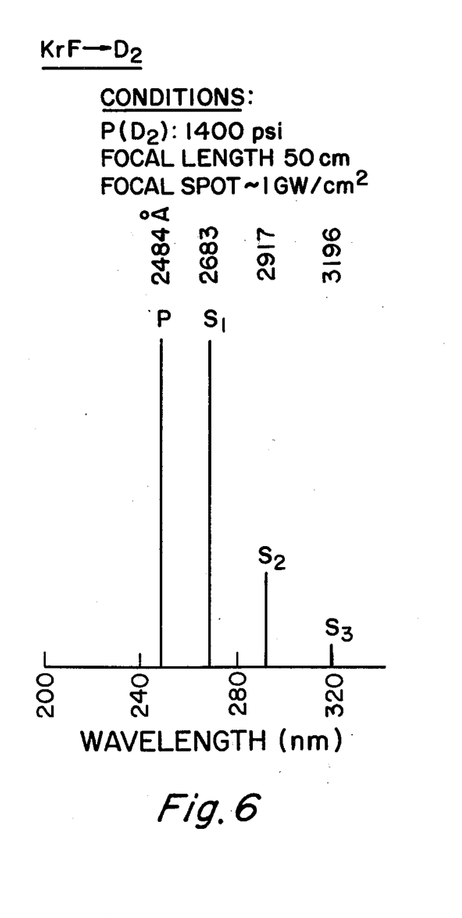
FIG. 6 is a graph of experimental data obtained in scattering KrF in $D_2$ at 1400 psi.
Figure 7:
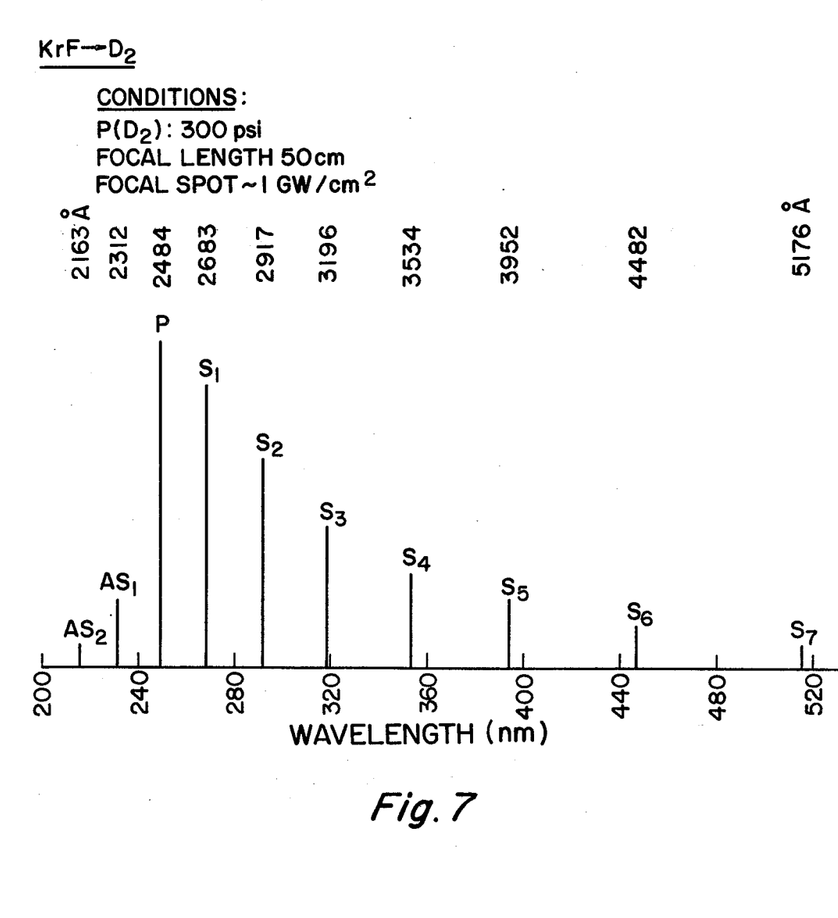
FIG. 7 is a graph of experimental data obtained in scattering KrF in $D_2$ at 300 psi.
Figure 8:
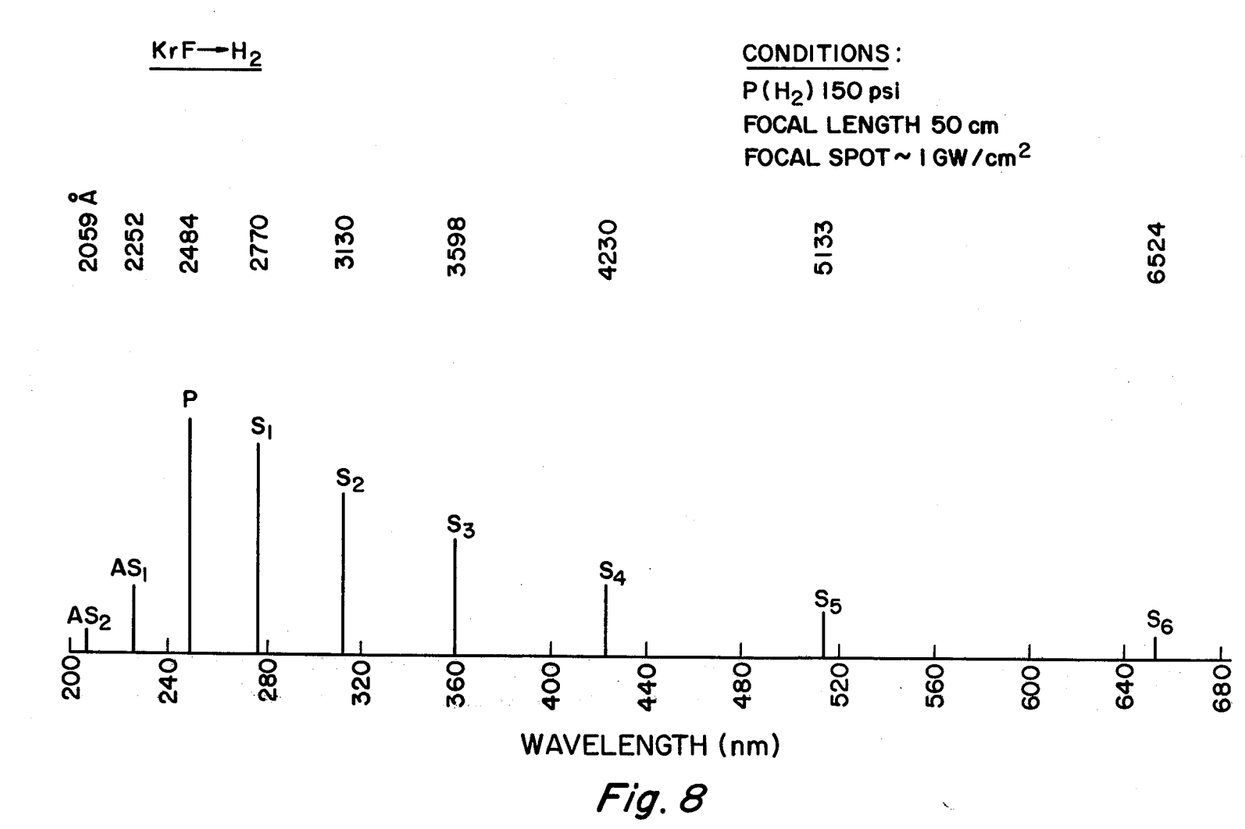
FIG. 8 is a graph of experimental data obtained in scattering KrF in $H_2$ at 150 psi.
Figure 9:
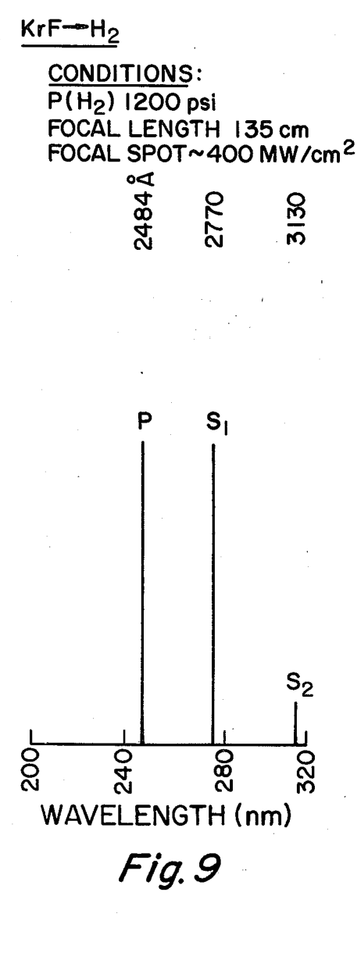
FIG. 9 is a graph of experimental data obtained in scattering KrF in $H_2$ at 1200 psi.
Figure 10:
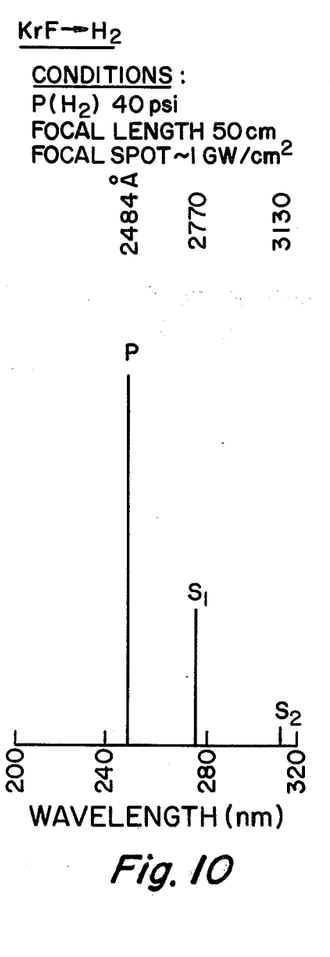
FIG. 10 is a graph of experimental data obtained in scattering KrF in $H_2$ at 40 psi.
Figure 11:
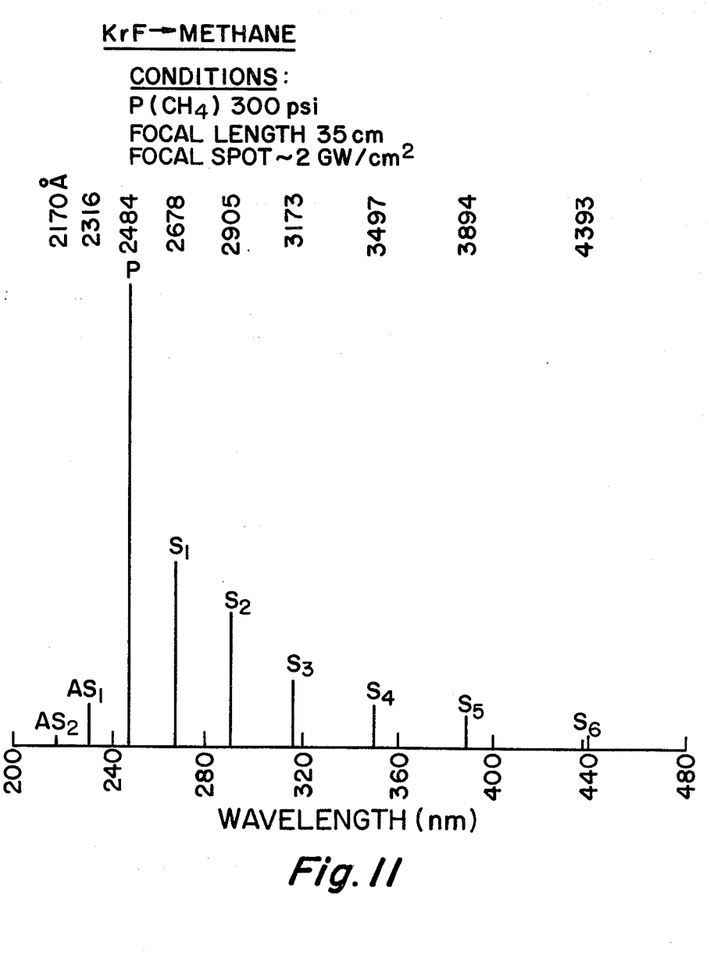
FIG. 11 is a graph of experimental data obtained in scattering KrF in methane at 300 psi.
Figure 12:
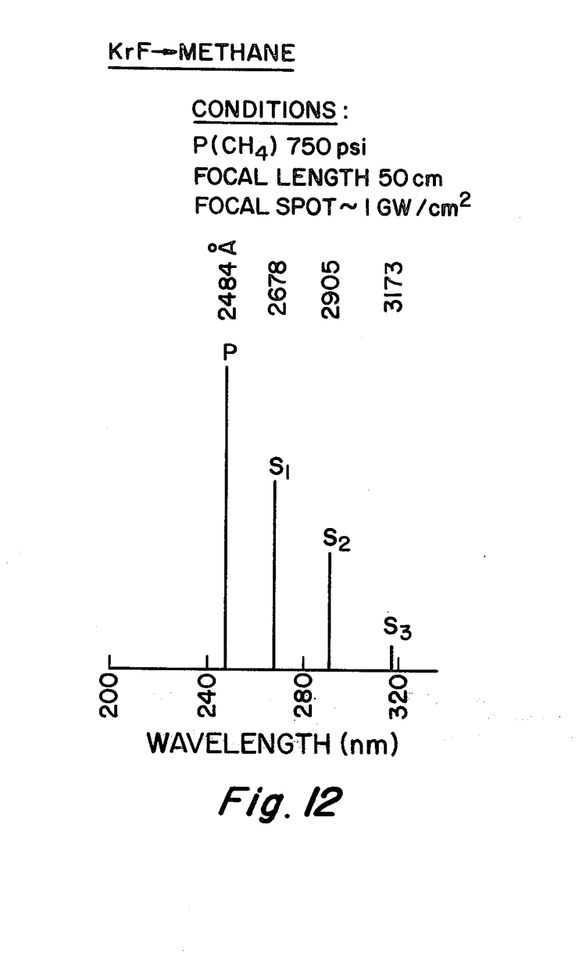
FIG. 12 is a graph of experimental data obtained in scattering KrF in methane at 750 psi.

FIGS. 6 through 21 disclose results obtained from pumping the various disclosed Raman scattering media by KrF and ArF lasers. The number of Stokes lines and the amplitudes of these lines have been found to vary significantly with the Raman scattering medium pressure and focal interaction length of the focused laser radiation. The Raman gain has been found to increase up to the saturated gain pressure which is approximately 150 psi for $H_2$, 300 psi for $D_2$, and about 375 psi for $CH_4$. At the saturated gain pressure, the maximum number of Stokes lines are produced for a given power density and focal interaction length. Similarly, as the focal interaction length is increased the Raman conversion to higher order Stokes signals is also increased. By combining these factors, with the knowledge that high energy densities also increase the number of produced Stokes signals, as disclosed in an article entitled "Energy and Time Characteristics of Stimulated Raman Scattering of Light" by V. A. Zubov et al. appearing in Sov. Phys. JETP 28, 231, (1969), conversion to particular Stokes signals can be enhanced to maximize energy transference to a desired wavelength. For example, FIGS. 6 and 7 disclose KrF scattering in $D_2$ at 1400 psi and 300 psi respectively with constant focal interaction length and power density. As is clear from these figures, the first Stokes is significantly enhanced by increasing the pressure of the $D_2$ Raman scattering medium. Similar results are shown in FIGS. 9 and 10 where variations in pressure and gain maximize $S_1$ production. Higher order Stokes signal, of course, can be increased by maximizing power density, minimizing pressure to the separated gain pressure, and maximizing focal interaction length.

Consequently, particular Stokes lines can be enhanced by varying the Raman scattering medium pressure, the focal interaction length of the laser radiation, and the power density of the laser radiation. By optimizing each of these parameters for a desired Stokes signal or signals, the numerous output wavelengths disclosed in FIGS. 6–21 can be obtained with maximal energy conversion efficiency.

Obviously many modifications and variations of the present invention are possible in light of the above teachings. For example, any desired Raman scattering medium could be used to produce desired wavelengths. It is therefore to be understood that within the scope of the appended claims, the invention may be practiced otherwise than is specifically described.

What is claimed is new and desired to be secured by letters patent of the United States is:

1. A method of shifting ultraviolet radiation comprising:
   retaining a molecular gaseous medium in an irradiation cell at a preselected pressure;
   irradiating said molecular gaseous medium with said ultraviolet radiation at a predetermined power density and predetermined focal interaction length;
   enhancing power output of a preselected frequency signal by varying said preselected pressure, said predetermined power density and said predetermined focal interaction length.

2. A method of optimizing a preselected Stokes signal comprising:
   retaining a molecular gaseous medium in an irradiation cell at a preselected pressure;
   irradiating said molecular gaseous medium with ultraviolet radiation at a predetermined power density and focal interaction length to generate Raman shifted ultraviolet radiation;
   enhancing power output of said preselected Stokes signal by adjusting said preselected pressure such that increases of said preselected pressure above the saturated gain pressure increase the Raman conversion to lower order Stokes signals.

3. A method of optimizing a preselected Stokes signal comprising:
   retaining a molecular gaseous medium in an irradiation cell at a preselected pressure;
   irradiating said molecular gaseous medium with ultraviolet radiation at a predetermined power density and focal interaction length to generate Raman shifted ultraviolet radiation;
   enhancing power output of said preselected Stokes signal by adjusting said preselected pressure, said predetermined power density and focal interaction length such that increases of said preselected pressure above the saturated gain pressure increase Raman conversion to lower order Stokes signals, while increases in said predetermined power density increase Raman conversion to higher order Stokes signals and increases in said predetermined focal interaction length increase Raman conversion to higher order Stokes signals.

4. A device for optimizing a preselected Stokes signal comprising:
   irradiation cell means containing a molecular gaseous medium at a preselected pressure;
   means for focusing coherent ultraviolet radiation at a predetermined power density and focal interaction length within said irradiation cell means to nonresonantly Raman shift said coherent ultraviolet radiation;
   means for modifying said preselected pressure of said molecular gaseous medium to enhance power output of said preselected Stokes signal.

5. The device of claim 4 wherein said molecular gaseous medium comprises $H_2$.

6. The device of claim 4 wherein said molecular gaseous medium comprises $D_2$.

7. The device of claim 4 wherein said molecular gaseous medium comprises methane.

8. The device of claim 4 wherein said molecular gaseous medium comprises a mixture of $H_2$ and $D_2$.

9. The device of claim 4 wherein said molecular gaseous medium comprises HD.

10. The device of claim 4 wherein said molecular gaseous medium comprises a mixture of $H_2$ and methane.

11. A device for generating coherent radiation at a predetermined wavelength in the ultraviolet spectral region comprising:
    means for producing a coherent ultraviolet output signal;
    irradiation cell means containing a molecular gaseous medium at a preselected pressure;
    means for focusing said coherent ultraviolet output signal at a predetermined power density and predetermined focal interaction length within said irradiation cell means to nonresonantly Raman shift said coherent ultraviolet output signal;
    means for adjusting said preselected pressure to optimize a preselected Stokes signal of said nonresonantly Raman shifted coherent ultraviolet output signal such that increases of said preselected pressure above the saturated gain pressure increase Raman conversion to lower order Stokes signals.

12. The device of claim 11 wherein said molecular gaseous medium comprises $H_2$.

13. The device of claim 11 wherein said molecular gaseous medium comprises $D_2$.

14. The device of claim 1 wherein said molecular gaseous medium comprises methane.

15. The device of claim 11 wherein said molecular gaseous medium comprises a mixture of $H_2$ and $D_2$.

16. The device of claim 11 wherein said molecular gaseous medium comprises HD.

17. The device of claim 11 wherein said molecular gaseous medium comprises a mixture of $H_2$ and methane.

18. A device for optimizing a preselected Stokes signal comprising:
    irradiation cell means containing a molecular gaseous medium at a preselected pressure;
    means for focusing coherent ultraviolet radiation at a predetermined power density and focal interaction length within said irradiation cell means to nonresonantly Raman shift said coherent ultraviolet radiation;

means for modifying said preselected pressure and said predetermined power density and focal interaction length such that higher pressures of said molecular gaseous medium above the saturated gain pressure increase Raman conversion to lower order Stokes signals, while greater power densities increase Raman conversion to higher order Stokes signals and longer focal interaction lengths increase Raman conversion to higher order Stokes signals.

19. The device of claim 18 wherein said molecular gaseous medium comprises $H_2$.

20. The device of claim 18 wherein said molecular gaseous medium comprises $D_2$.

21. The device of claim 18 wherein said molecular gaseous medium comprises methane.

22. The device of claim 18 wherein said molecular gaseous medium comprises a mixture of $H_2$ and $D_2$.

23. The device of claim 18 wherein said molecular gaseous medium comprises HD.

24. The device of claim 18 wherein said molecular gaseous medium comprises a mixture of $H_2$ and methane.

25. A device for generating coherent radiation at a predetermined wavelength in the ultraviolet spectral region comprising:

means for producing a coherent ultraviolet output signal;

irradiation cell means containing a molecular gaseous medium at a preselected pressure;

means for focusing said coherent ultraviolet output signal at a plurality of predetermined power densities and focal interaction lengths within said irradiation cell means to nonresonantly Raman shift said coherent ultraviolet output signal;

means for adjusting said preselected pressure to optimize a preselected Stokes signal of said nonresonantly Raman shifted coherent ultraviolet output signal;

whereby increases of said preselected pressure above the saturated gain pressure increase Raman conversion to lower order Stokes signals, while increases in said predetermined power density increase the Raman conversion to higher order Stokes signals and increases in said predetermined focal interaction length increase the Raman conversion to higher order Stokes signals.

* * * * *